United States Patent Office.

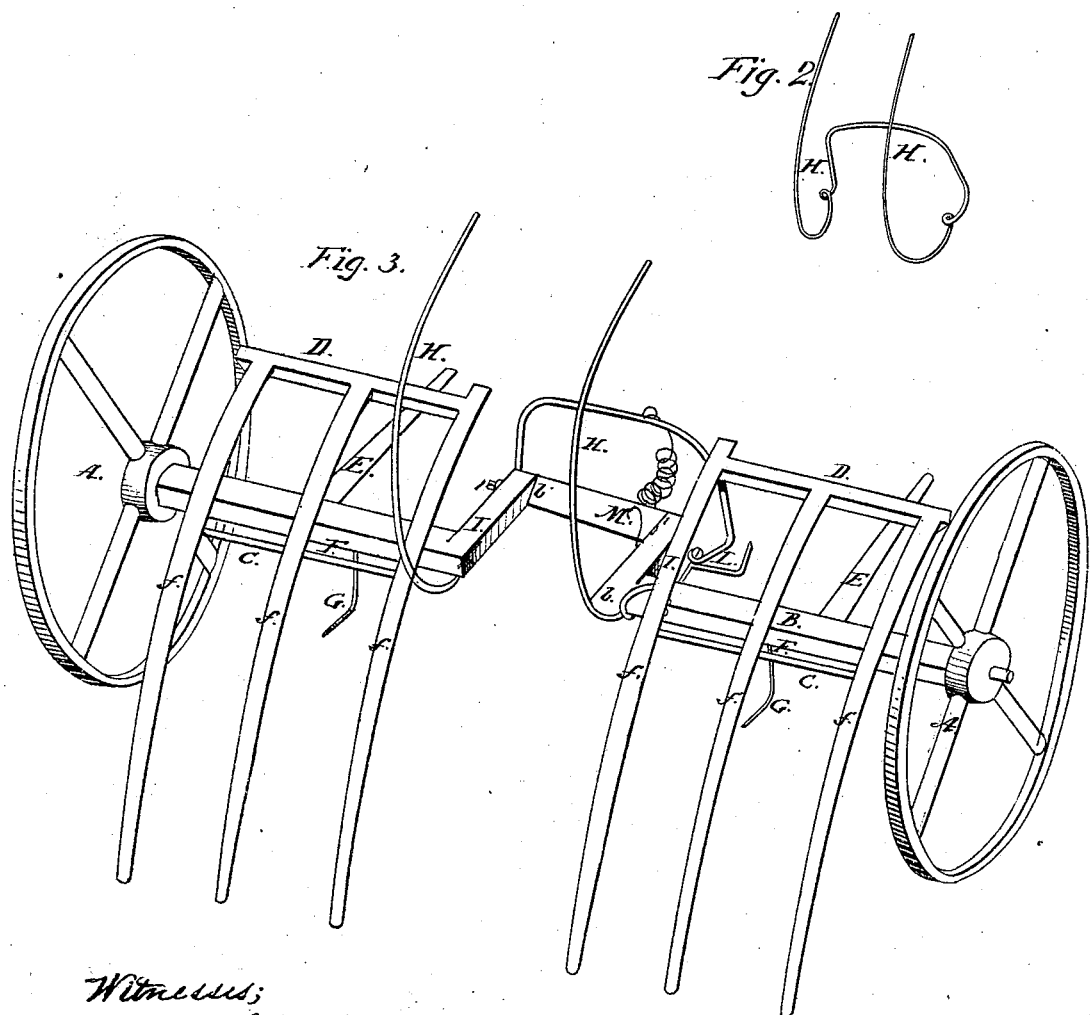

EARL PALMER, OF SOLON, NEW YORK.

Letters Patent No. 68,227, dated August 27, 1867.

---

IMPROVEMENT IN GRAIN-RAKES.

---

The Schedule referred to in these Letters Patent and making part of the same.

---

TO ALL WHOM IT MAY CONCERN:

Be it known that I, EARL PALMER, of Solon, in the county of Cortland, State of New York, have invented a new and improved Hand Grain-Rake; and I do hereby declare that the following is a full and exact description thereof, reference being had to the accompanying drawings, and to the letters of reference marked thereon.

The nature of my invention consists in a hand-rake constructed to move on wheels, with fingers attached to the axle which supports the wheels, by which the grain is taken up from the swath or gavel in quantities to make a bundle at a time, and held in position on the rake for binding. The rake precedes the binder, and is propelled and guided by handles attached to the axle.

Figure 1 is a view of a set of fingers.

Figure 2 shows the clasps or binders.

Figure 3 is a perspective view of the machine entire.

To enable others skilled in the art to make and use my invention, I will proceed to describe its construction and operation.

To construct my rake I make two wheels, A A, fig. 3, about three feet in diameter. These run upon an axle, B, fig. 3. The wheels and axle are constructed of any suitable material, and the axle is about five feet in length, being such as to place the wheels clear of the swath, one on either side. At equal distances from the wheels, at $b\ b$, a joint or elbow is made in the axle, and the axle extends back to $b'\ b'$, a distance of about ten inches, giving a space in this elbow of the axle of about ten inches deep and eight inches broad, as shown in fig. 3. On each side of this elbow in the axle, and between it and the wheel, is attached to the axle a set of fingers, $f f f$, which are three feet and eight inches, or thereabouts, in length, and are kept in position in relation to each other by the cross-rod C and the head-bar D. The fingers are attached to the axle by a hook and eye, as shown in fig. 3, or any suitable form of attachment, to give the fingers play necessary to drop them in position by raising or lowering them, so as to take up the grain and to overcome any inequalities in the ground by elevating or depressing the handles E E. The fingers extend back of the axle or rake-head about eight inches. At the points F F are the braces G G, set in the rake-head or axle, and are of a form and length adapted to receive and hold the grain as it is taken up by the fingers. H H, fig. 2, is a clasp or folder, and is attached to the rake-head or axle at I I, and held in the position desired by means of the spring K and the hasp L, as shown in fig. 3.

The workman takes his place behind the rake and pushes it forward by the handles. As these are raised to a proper position the fingers running under the swath take up the grain, which moves back upon the fingers. The clasp H H is raised, so that the points give a clear space for the grain to fall back upon the fingers, and is held by the hasp L in position. When enough grain for a bundle has been taken up the workman springs the hasp L, the clasp or folder drops, and the grain is securely embraced between it and the braces G G, and brought back to the workman, who, passing his hand through the space made by the elbows in the rake-head or axle, binds the sheaf, raises the clasp H, the sheaf drops out, and the rake is moved on.

The advantage of this rake is apparent, as by an easy movement it is pressed forward, the fingers gather up the grain and place it in a position of most convenient elevation for binding with ease and dispatch.

The clasp H H, fig. 2, is made of strong wire, and shaped so as to receive the action of the spring K, which passes from it to the axle at M, and not to interfere with the movements of the workman. This clasp is easily removed and adjusted, and the rake is worked with or without it. In grain containing thistles it is found of special service.

I reserve to myself the privilege of changing the dimensions of the rake, or of any of its parts, and the use of any material deemed advisable in its construction.

What I claim as my invention, and desire to secure by Letters Patent, is—

1. The axle B, constructed as described, in combination with the clasp H and spring K, substantially as and for the purpose set forth.

2. The clasp or binder H, with the spring K and hasp L, attached to the axle, and working in conjunction therewith, and the fingers $f f f$, as described.

3. The axle B, bent at its centre, as described, in combination with the rake sections D D, independent of each other, and arranged to operate substantially as and for the purpose set forth.

EARL PALMER.

Witnesses:
BENJAMIN HORTON,
D. H. BURR.